(12) United States Patent
Salkintzis

(10) Patent No.: US 11,096,106 B2
(45) Date of Patent: Aug. 17, 2021

(54) RULES HANDLING IN A WIRELESS COMMUNICATION SYSTEM

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/013,077

(22) Filed: Feb. 2, 2016

(65) Prior Publication Data

US 2017/0289888 A1 Oct. 5, 2017

(51) Int. Cl.
| | | |
|---|---|---|
| *H04W 36/22* | (2009.01) | |
| *H04W 28/12* | (2009.01) | |
| *H04L 12/801* | (2013.01) | |
| *H04W 36/00* | (2009.01) | |
| *H04L 12/54* | (2013.01) | |
| *H04W 28/02* | (2009.01) | |
| *H04L 12/863* | (2013.01) | |
| *H04W 48/18* | (2009.01) | |
| *H04W 28/08* | (2009.01) | |

(52) U.S. Cl.
CPC ......... *H04W 36/22* (2013.01); *H04L 12/5692* (2013.01); *H04L 47/10* (2013.01); *H04W 28/12* (2013.01); *H04W 36/0083* (2013.01); *H04L 47/627* (2013.01); *H04W 28/02* (2013.01); *H04W 28/08* (2013.01); *H04W 48/18* (2013.01)

(58) Field of Classification Search
CPC ....... H04L 47/10; H04L 47/14; H04L 47/627; H04W 28/02; H04W 28/12; H04W 36/0022; H04W 36/0083; H04W 36/14; H04W 36/22; H04W 36/30; H04W 48/08; H04W 48/16; H04W 48/18; H04W 76/025; H04W 76/026; H04W 84/12; H04W 88/06

See application file for complete search history.

(56) References Cited

U.S. PATENT DOCUMENTS

| | | | | |
|---|---|---|---|---|
| 2015/0078153 A1* | 3/2015 | Kuo | .................. | H04W 76/27 370/230 |
| 2015/0327129 A1* | 11/2015 | Faccin | .............. | H04W 36/0055 370/331 |
| 2016/0029295 A1* | 1/2016 | Nagasaka | ............. | H04W 48/18 370/237 |
| 2016/0219480 A1* | 7/2016 | Roeland | ............ | H04W 28/0268 |

(Continued)

OTHER PUBLICATIONS

3GPP TS 23.161 V0.0.1 (Jun. 2015), 3rd Generation Partnership Project; Technical Specification Group Services and System Aspecs; Network-Based IP Flow Mobility (NBIFOM), all pages.

*Primary Examiner* — Walli Z Butt
*Assistant Examiner* — Thad N Defauw
(74) *Attorney, Agent, or Firm* — Kunzler Bean & Adamson

(57) ABSTRACT

Apparatuses, methods, and systems are disclosed for rules handling. One apparatus includes a processor that determines whether a remote unit will apply network traffic steering data for routing data traffic on a first route across a first access network and a second route across a second access network. In some embodiments, the first and second routes may be different. In various embodiments, the apparatus includes a transmitter that transmits information that indicates whether the remote unit will apply the network traffic steering data.

30 Claims, 7 Drawing Sheets

(56) References Cited

U.S. PATENT DOCUMENTS

| | | | |
|---|---|---|---|
| 2016/0255533 A1* | 9/2016 | Sirotkin | H04W 48/16 |
| | | | 370/230 |
| 2017/0181070 A1* | 6/2017 | Gupta | H04W 28/08 |
| 2017/0374610 A1* | 12/2017 | Kim | H04W 28/02 |
| 2018/0103405 A1* | 4/2018 | Kim | H04W 48/18 |
| 2018/0132127 A1* | 5/2018 | Sirotkin | H04W 48/16 |
| 2018/0184341 A1* | 6/2018 | Faccin | H04W 36/0055 |

* cited by examiner

RULES HANDLING IN A WIRELESS COMMUNICATION SYSTEM

FIELD

The subject matter disclosed herein relates generally to wireless communications and more particularly relates to rules handling in a wireless communication system.

BACKGROUND

The following abbreviations are herewith defined, at least some of which are referred to within the following description.

3GPP Third Generation Partnership Project
ACK Positive-Acknowledgment
ANDSF Access Network Discovery and Selection Function
AP Access Point
APN Access Point Name
AS Access Stratum
BLER Block Error Ratio
BPSK Binary Phase Shift Keying
CAZAC Constant Amplitude Zero Auto Correction
CCA Clear Channel Assessment
CCE Control Channel Element
CP Cyclic Prefix
CQI Channel Quality Information
CSI Channel State Information
CSS Common Search Space
DCI Downlink Control Information
DL Downlink
eNB Evolved Node B
EPDCCH Enhanced Physical Downlink Control Channel
E-RAB E-UTRAN Radio Access Bearer
EPC Evolved Packet Core
ETSI European Telecommunications Standards Institute
E-UTRAN Evolved Universal Terrestrial Radio Access Network
FBE Frame Based Equipment
FDD Frequency Division Duplex
FDMA Frequency Division Multiple Access
FEC Forward Error Correction
GPRS General Packet Radio Service
GTP GPRS Tunneling Protocol
HARQ Hybrid Automatic Repeat Request
H-PLMN Home Public Land Mobile Network
IP Internet Protocol
ISRP Inter-System Routing Policy
LAA Licensed Assisted Access
LBE Load Based Equipment
LBT Listen-Before-Talk
LTE Long Term Evolution
MCL Minimum Coupling Loss
MCS Modulation and Coding Scheme
MME Mobility Management Entity
MU-MIMO Multi-User, Multiple-Input, Multiple-Output
NACK or NAK Negative-Acknowledgment
NAS Non-Access Stratum
NBIFOM Network-Based IP Flow Mobility
OFDM Orthogonal Frequency Division Multiplexing
PCell Primary Cell
PBCH Physical Broadcast Channel
PCO Protocol Configuration Options
PCRF Policy and Charging Rules Function
PDCCH Physical Downlink Control Channel
PDCP Packet Data Convergence Protocol
PDN Packet Data Network
PDSCH Physical Downlink Shared Channel
PDU Protocol Data Unit
PGW Packet Data Network Gateway
PHICH Physical Hybrid ARQ Indicator Channel
PLMN Public Land Mobile Network
PRACH Physical Random Access Channel
PRB Physical Resource Block
PUCCH Physical Uplink Control Channel
PUSCH Physical Uplink Shared Channel
QoS Quality of Service
QPSK Quadrature Phase Shift Keying
RAB Radio Access Bearer
RAN Radio Access Network
RAR Random Access Response
RRC Radio Resource Control
RX Receive
SC-FDMA Single Carrier Frequency Division Multiple Access
SCell Secondary Cell
SCH Shared Channel
SGW Serving Gateway
SIB System Information Block
SINR Signal-to-Interference-Plus-Noise Ratio
SR Scheduling Request
TAU Tracking Area Update
TBS Transport Block Size
TCP Transmission Control Protocol
TDD Time-Division Duplex
TDM Time Division Multiplex
TEID Tunnel Endpoint Identification ("ID")
TX Transmit
UCI Uplink Control Information
UE User Entity/Equipment (Mobile Terminal)
UL Uplink
UMTS Universal Mobile Telecommunications System
UTRAN Universal Terrestrial Radio Access Network
V-PLMN Visited Public Land Mobile Network
WAG Wireless Access Gateway
WiMAX Worldwide Interoperability for Microwave Access
WLAN Wireless Local Area Network In wireless communications networks, support may be provided for NBIFOM, which enables a UE to establish IP flows simultaneously over multiple access networks (e.g., WLAN access and cellular access), and to move one or more flows between these access networks in a transparent and network-controlled fashion. For example, a UE may establish web-browsing IP flows over WLAN access and voice-over-IP flows over cellular access (e.g., UTRAN or E-UTRAN access) and transfer any of these flows between WLAN and cellular access when desired (e.g., when the WLAN signal becomes poor, or when the network decides to do so). In the context of NBIFOM, only "trusted" WLANs may be considered (e.g., WLANs that deploy a WAG that connects to a PGW in an EPC).

In one configuration, an NBIFOM-capable UE may roam in a visited PLMN (composed of a cellular access and a visited EPC) and establish a multi-access PDN connection to a PGW in a home PLMN. This multi-access PDN connection may include two communication paths, each one over a different access network (e.g., one path over cellular access "path 1" and another path over trusted WLAN access "path 2"). The UE may transmit uplink IP traffic to the PGW either over path 1 or path 2 based on pre-configured routing rules in the UE. Similarly, the PGW may transmit downlink IP traffic to the UE either over path 1 or path 2 based on the same set of pre-configured routing rules. By changing these routing rules in the UE and PGW, any IP traffic flow may be moved from one path to the other path (or from one access to the other) in a way that is transparent to endpoints of communication (e.g., without altering the connectivity parameters of these flows, such as, IP addresses, protocol and port numbers).

The routing rules in the UE and PGW, which control the routing of IP flows across path 1 and path 2 for a given multi-access PDN connection, may be provided either by the UE or by the PGW (not by both). When provided by the UE, the multi-access PDN connection may be said to operate in UE-initiated mode. When provided by the PGW, the multi-access PDN connection may be said to operate in Network-initiated mode. This NBIFOM operation mode may be negotiated between the UE and PGW when the first path of the multi-access PDN connection is established.

In certain configurations, traffic is routed within a multi-access PDN connection between the UE and the PGW (e.g., using path 1 and path 2). Downlink traffic may arrive at the PGW via an SGi interface and be routed to path 1 or path 2 based on the pre-established routing rules in the PGW. When this traffic arrives at the UE, it may be delivered to an appropriate application via an aggregation function. Similarly, uplink traffic generated in the UE, may be routed to path 1 or path 2 based on the pre-established routing rules in the UE. When this traffic arrives at the PGW, it may be delivered to the SGi interface via an aggregation function and may be further routed to the destination address (e.g., to a media server).

As previously noted, the routing rules in the UE and PGW may be provided by either the UE or the PGW, depending on a negotiated NBIFOM operation mode. When provided by the UE, the UE is in charge of changing these rules whenever needed. For example, when the UE decides to move an existing IP flow from path 1 to path 2, the UE updates its own routing rules and updates also the routing rules in the PGW by sending a special signaling message to the PGW. When the routing rules are provided by the PGW, the network may decide at any moment to update them according to network-related conditions. For example, when the cellular access is congested, the network may decide to update the routing rules so that some (or all) IP flows in the multi-access PDN connection are moved to path 2 (e.g., to WLAN access). In this case, the network updates the routing rules in the PGW and updates also the routing rules in the UE by sending a signaling message to the UE. In some configurations, the network may update the routing rules based on information received by the UE, for example, on information indicating the WLAN signal is poor in the UE.

In some configurations, a RAN may deliver certain radio-related thresholds to the UE, called RAN thresholds. These thresholds may be delivered to UE in either an Idle mode or a Connected mode. Lower-layers (e.g., the layers implementing the radio-related protocols) in the UE may compare the RAN thresholds to the values of measured radio parameters and may determine if IP traffic should be moved to WLAN access or to 3GPP access. For example, when the lower-layers determine that the signal strength on E-UTRAN access is below the applicable threshold provided by RAN and also the signal strength on WLAN access is above the applicable threshold provided by RAN, then traffic may be moved to WLAN access. The decision by the lower-layers to move traffic to WLAN access may be indicated to higher-layers (e.g., layers implementing non-radio-related protocols) in the UE by a "move-traffic-to-WLAN" indication.

In general, when the UE and the RAN support RAN thresholds (or the RAN-assisted WLAN Interworking feature, as defined in 3GPP specifications), the lower-layers in the UE may generate indications such as "move-traffic-to-WLAN" or "move-traffic-from-WLAN" to trigger the higher-layers in the UE to move traffic to WLAN or to move traffic to cellular access respectively. As may be appreciated, such indications may apply to all IP traffic, not to selected IP flows. In other words, the "move-traffic-to-WLAN" indication may mean moving all IP flows from cellular access to WLAN access.

In various configurations, the "move-traffic-to-WLAN" and/or the "move-traffic-from-WLAN" indications may conflict with the routing rules in the UE which govern the traffic routing within a multi-access PDN connection. For example, the routing rules in the UE may steer web-browsing traffic to WLAN access (e.g., path 2) but an indication "move-traffic-from-WLAN" may be generated by the lower-layers which calls for traffic to be routed to cellular access.

BRIEF SUMMARY

Apparatuses for rules handling are disclosed. Methods and systems also perform the functions of the apparatus. In one embodiment, the apparatus includes a processor that determines whether a remote unit will apply network traffic steering data for routing data traffic on a first route across a first access network and a second route across a second access network. In some embodiments, the first and second routes may be different. In various embodiments, the apparatus includes a transmitter that transmits information that indicates whether the remote unit will apply the network traffic steering data.

In one embodiment, the first route includes a 3rd generation partnership project ("3GPP") access network route. In a further embodiment, the second route includes a wireless local area network ("WLAN") route. In certain embodiments, the network traffic steering data includes radio access network ("RAN") thresholds. In various embodiments, the transmitter transmits a first indication if the remote unit will apply the network traffic steering data and transmits a second indication if the remote unit will not apply the network traffic steering data. In such embodiments, the first indication includes a set indication and the second indication comprises an unset indication.

In some embodiments, the apparatus includes a packet data network gateway ("PGW") and the transmitter transmits the information to a user equipment ("UE"). In various embodiments, the information indicates whether the UE will apply RAN thresholds. In one embodiment, transmitting the information includes transmitting a RAN rules handling indication. In certain embodiments, the processor determines whether the remote unit will apply the network traffic steering data by applying predetermined rules for determining whether the remote unit will apply the network traffic steering data. In various embodiments, the processor determines whether the remote unit will apply the network traffic steering data in response to the remote unit requesting a multi-access packet data network ("PDN") connection.

A method for rules handling, in one embodiment, includes determining whether a remote unit will apply network traffic steering data for routing data traffic on a first route across a first access network and a second route across a second access network. In such an embodiment, the first and second routes may be different. In various embodiments, the method may include transmitting information that indicates whether the remote unit will apply the network traffic steering data.

In one embodiment, an apparatus includes a receiver that receives network traffic steering data and first information that indicates whether to apply the network traffic steering data for routing data traffic on a first route across a first access network and a second route across a second access network. In such an embodiment, the first and second routes may be different. The apparatus may also include a transmitter that transmits second information that indicates a need to change data traffic routing based on the first information and the network traffic steering data.

In certain embodiments, the receiver receives the network traffic steering data from a radio access network ("RAN"). In various embodiments, the network traffic steering data includes RAN thresholds. In one embodiment, the apparatus includes a user equipment ("UE"). In some embodiments, the transmitter transmits the second information from a UE to a packet data network gateway ("PGW"). In certain embodiments, the second information is a move-traffic-to-wireless local area network ("WLAN") message or a move-traffic-from-WLAN message. In one embodiment, the first information includes a first indication if the network traffic steering data will be applied and a second indication if the network traffic steering data will not be applied. In such an embodiment, the first indication includes a set indication and the second indication includes an unset indication.

In certain embodiments, the first information includes a RAN rules handling indication. In one embodiment, the apparatus includes a processor that determines whether to transmit the second information based on the first information and the network traffic steering data. In such an embodiment, the processor determines whether to transmit the second information by: determining to transmit the second information if the first information indicates that the network traffic steering data is to be applied and if the network traffic steering data indicates that a change to the data traffic routing is to be made; and determining not to transmit the second information if the first information indicates that the network traffic steering data is to not be applied.

Another method for rules handling includes receiving network traffic steering data. The method may also include receiving first information that indicates whether to apply the network traffic steering data for routing data traffic on a first route across a first access network and a second route across a second access network. In such an embodiment, the first and second routes may be different. In some embodiments, the method includes transmitting second information that indicates a need to change data traffic routing based on the first information and the network traffic steering data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
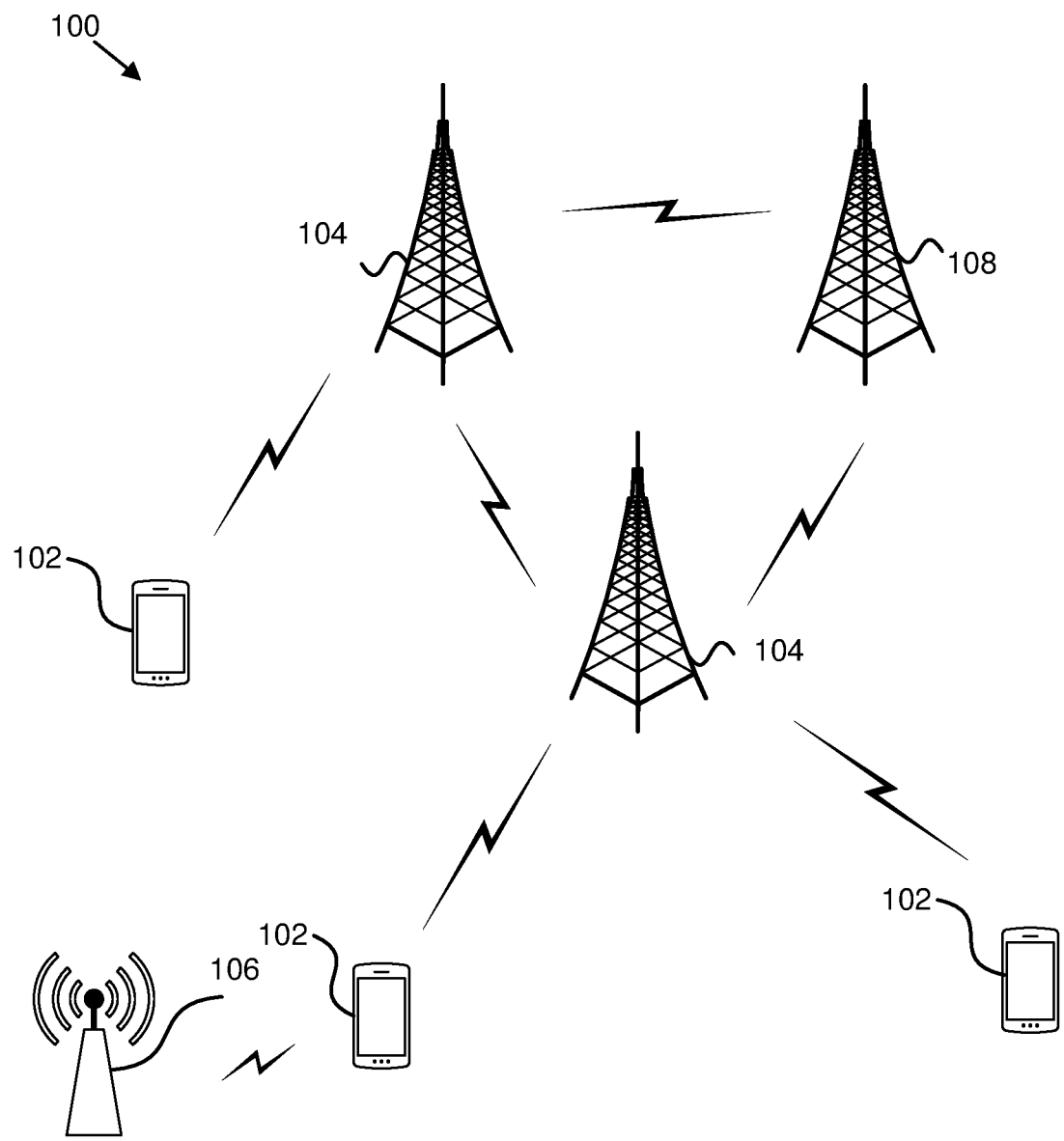
FIG. 1 is a schematic block diagram illustrating one embodiment of a wireless communication system for rules handling.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for rules handling. In one embodiment, the wireless communication system 100 includes remote units 102, base units 104, unlicensed carriers 106, and PGWs 108. Even though a specific number of remote units 102, base units 104, unlicensed carriers 106 and PGWs 108 are depicted in FIG. 1, one of skill in the art will recognize that any number of remote units 102, base units 104, unlicensed carriers 106 and PGWs 108 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals. Furthermore, the remote units 102 may communicate directly with one or more unlicensed carriers 106 or PGWs 108.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that may include one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. For example, one or more base units 104 may be communicably coupled to an MME, an SGW, and/or the PGW 108.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain. The unlicensed carriers 106 may be any suitable unlicensed carrier, such as a Wi-Fi access point ("AP"). The unlicensed carriers 106 may communicate with one or more of the remote units 102. Moreover the unlicensed carriers 106 may facilitate WLAN access and/or may be part of a WLAN route. The PGW 108 may be any suitable PGW that performs functions know in the art.

In one embodiment, an apparatus (e.g., PGW 108) may determine whether a remote unit 102 will apply network traffic steering data for routing data traffic on a first route across a first access network (e.g., 3GPP network route) and a second route across a second access network (e.g., WLAN route). In such an embodiment, the first and second routes may be different. The apparatus may transmit information that indicates whether the remote unit 102 will apply the network traffic steering data. Accordingly, by transmitting whether the remote unit 102 will apply network traffic steering data, the remote unit 102, such as a UE, may use the transmitted data to selectively send "move-traffic-to-WLAN" and/or "move-traffic-from-WLAN" messages.

In another embodiment, an apparatus (e.g., UE, remote unit 102) may receive network traffic steering data. The apparatus may also receive first information that indicates whether to apply the network traffic steering data for routing data traffic on a first route across a first access network and a second route across a second access network. In such an embodiment, the first and second routes may be different. The apparatus may transmit second information that indicates a need to change data traffic routing based on the first information and the network traffic steering data. Accordingly, by receiving the network traffic steering data, the apparatus may selectively send "move-traffic-to-WLAN" and/or "move-traffic-from-WLAN" messages.

Figure 2:
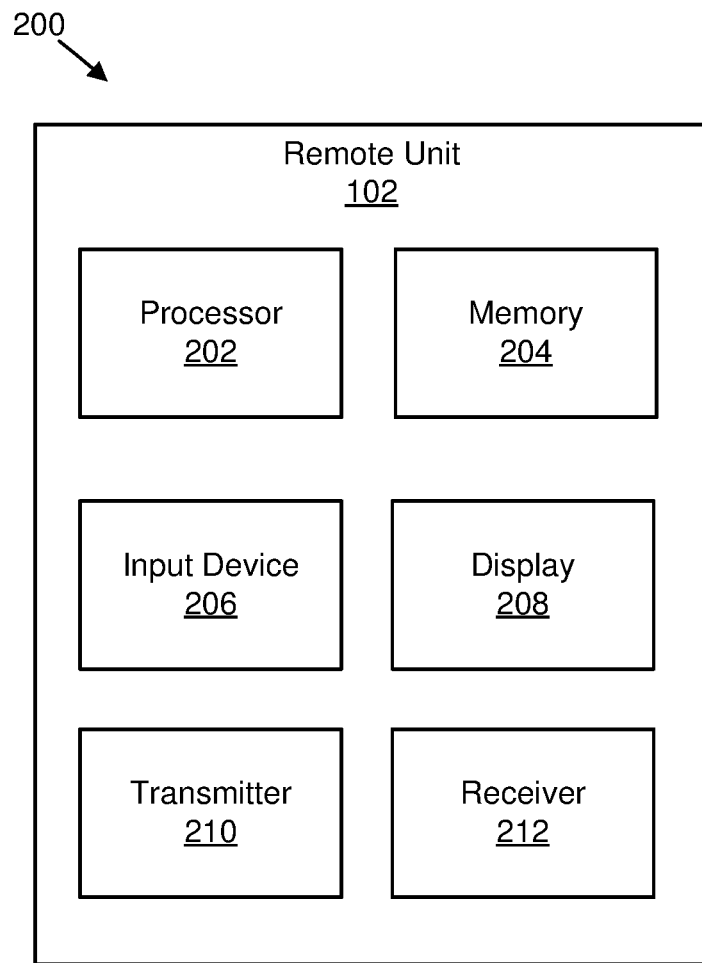
FIG. 2 is a schematic block diagram illustrating one embodiment of an apparatus that may be used for rules handling.

FIG. 2 depicts one embodiment of an apparatus 200 that may be used for rules handling. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine whether to transmit a second information based on a first information and network traffic steering data.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to information to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the receiver 212 is used to receive network traffic steering data and first information that indicates whether to apply the network traffic steering data for routing data traffic on a first route across a first access network and a second route across a second access network. In such embodiments, the first and second routes may be different. In one embodiment, the transmitter 210 is used to transmit second information that indicates a need to change data traffic routing based on the first information and the network traffic steering data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
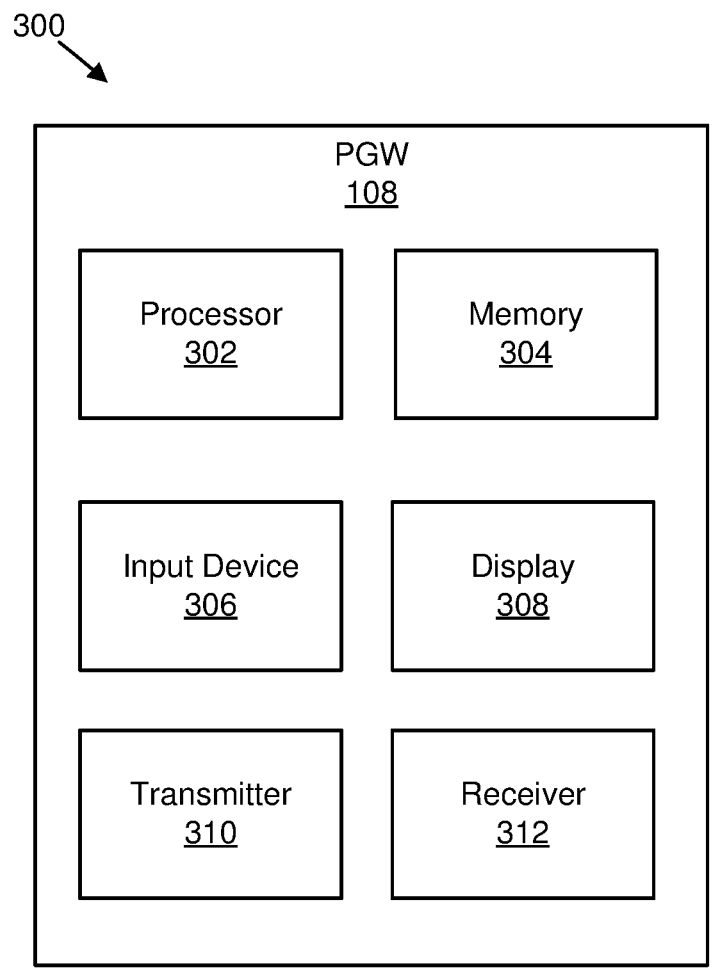
FIG. 3 is a schematic block diagram illustrating another embodiment of an apparatus that may be used for rules handling.

FIG. 3 depicts another embodiment of an apparatus 300 that may be used for rules handling. The apparatus 300 includes one embodiment of the PGW 108. Furthermore, the PGW 108 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine whether the remote unit 102 will apply network traffic steering data for routing data traffic on a first route across a first access network and a second route across a second access network. In such embodiments, the first and second routes may be different.

The transmitter 310 is used to provide DL communication signals to the remote unit 102 and the receiver 312 is used to receive UL communication signals from the remote unit 102. In certain embodiments, the transmitter 310 is used to transmit information that indicates whether the remote unit will apply the network traffic steering data.

Figure 4:
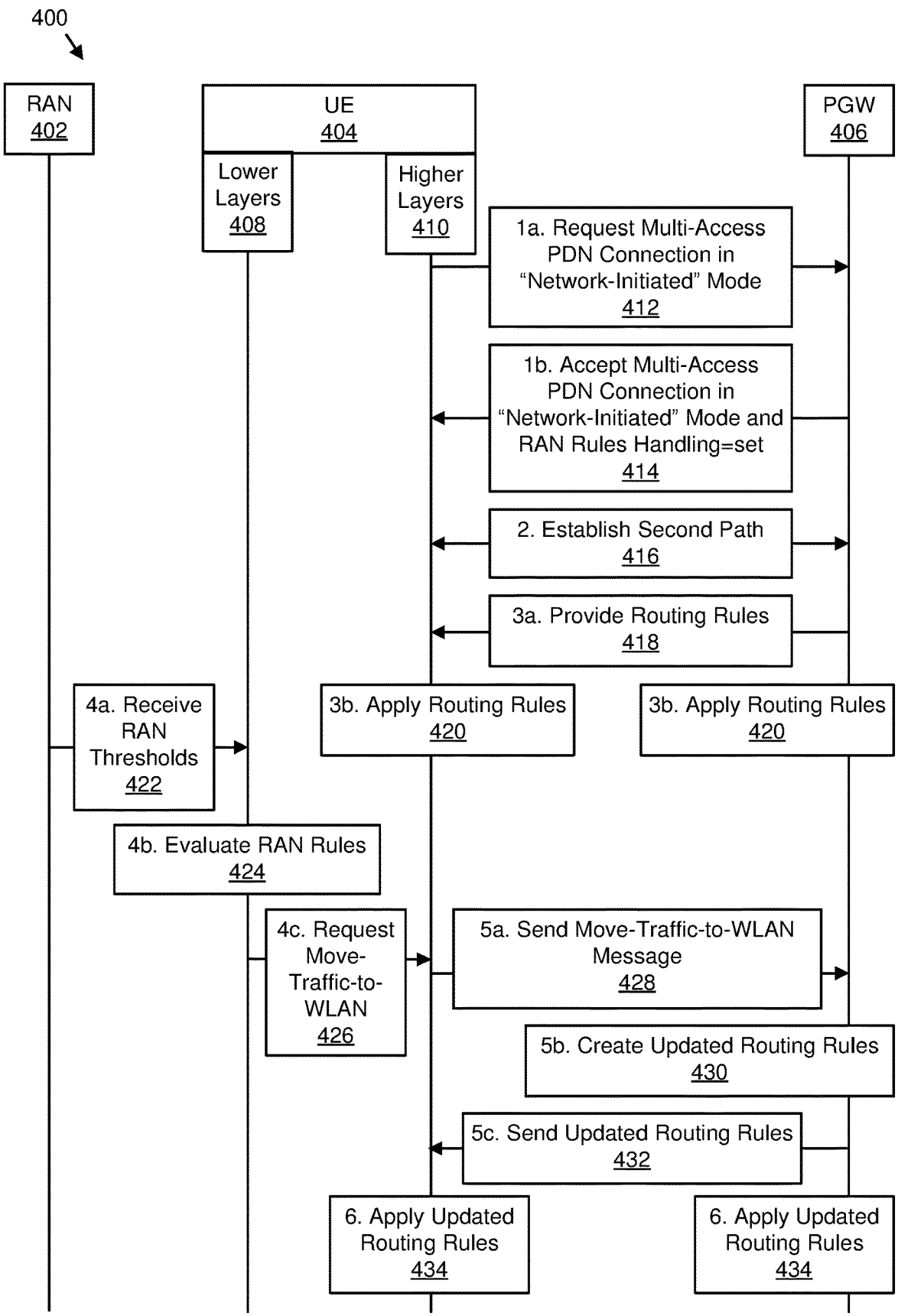
FIG. 4 illustrates one embodiment of communication used for rules handling.

FIG. 4 illustrates one embodiment of communication 400 used for rules handling. In the illustrated embodiment, communication with a RAN 402, a UE 404, and a PGW 406 are illustrated. In certain embodiments, the UE 404 may be one embodiment of the remote unit 102. In some embodiments, the RAN 402 and the PGW 406 may be embodiments of the base unit 104. Moreover, communication with lower layers 408 and higher layers 410 of the UE 404 are also illustrated. As may be appreciated, the RAN 402 and the PGW 406 may include features similar to those found in the base unit 104 (e.g., the RAN 402 and/or the PGW 406 may include a processor 302, a memory 304, an input device 306, a display 308, a transmitter 310, and/or a receiver 312).

As illustrated, the higher layers 410 of the UE 404 may request 412 a multi-access PDN connection in a "Network-Initiated" mode via a message sent to the PGW 406. The PGW 406 may accept 414 the multi-access PDN connection in the "Network-Initiated" mode via a message sent to the higher layers 410 of the UE 404. Further, the accept 414 message may include information (e.g., an indication) that indicates whether the UE 404 will apply network traffic steering data (e.g., RAN thresholds). Moreover, the information may be called a "RAN Rules Handling" parameter. The "RAN Rules Handling" parameter in FIG. 4 is equal to set. With the request 412 and acceptance 414, a first path (e.g., either over cellular access or trusted WLAN access) of a multi-access PDN connection is established.

The higher layers 410 of the UE 404 and the PGW 406 establish 416 a second path of the multi-access PDN connection with one another. Moreover, the PGW 406 provides 418 routing rules to the higher layers 410 of the UE 404. The routing rules are used for routing data among the first and second paths of the multi-access PDN connection. The higher layers 410 of the UE 404 and the PGW 406 apply 420 the routing rules. The lower layers 408 of the UE 404 receives 422 RAN thresholds from the RAN 402. In one embodiment, the RAN thresholds may be from a visited PLMN. Further, the lower layers 408 of the UE 404 evaluate 424 the RAN rules using the RAN thresholds. Based on the evaluation 424, the lower layers 408 of the UE 404 may request 426 that a "move-traffic-to-WLAN" message be sent by the higher layers 410 of the UE 404.

Because the "RAN Rules Handling" parameter is equal to set (e.g., meaning that RAN rules are to be applied), the higher layers 410 of the UE 404 sends 428 a "move-traffic-to-WLAN" message to the PGW 406. As may be appreciated, while the "move-traffic-to-WLAN" message is described herein for the request 426 and sending 428, a "move-traffic-from-WLAN" message may similarly be used for the request 426 and sending 428. It should be noted that a "move-traffic-from-WLAN" message is used to indicate that traffic should be moved to a 3GPP (e.g., cellular) access network, while a "move-traffic-to-WLAN" message is used to indicate that traffic should be moved to a WLAN access network. In certain embodiments, the higher layers 410 of the UE 404 may only send 428 a "move-traffic-to-WLAN" message or a "move-traffic-from-WLAN" message to the PGW 406 if the following conditions are met: the "RAN Rules Handling" parameter is equal to set; the UE 404 has no ISRP rule valid in the registered PLMN; and the UE 404 supports RAN-assisted WLAN interworking.

After receiving the "move-traffic-to-WLAN" message (or "move-traffic-from-WLAN" message), the PGW 406 creates 430 updated routing rules for the multi-access PDN connection. In some embodiments, if a "move-traffic-from-WLAN" message is received, the updated routing rules instruct the UE 404 to move all traffic within the multi-access PDN connection to the cellular path. In certain embodiments, if a "move-traffic-to-WLAN" message is received, the updated routing rules instruct the UE 404 to move all traffic within the multi-access PDN connection to WLAN access. The PGW 406 then sends 432 the updated routing rules to the higher layers 410 of the UE 404. The higher layers 410 of the UE 404 and the PGW 406 apply 434 the updated routing rules.

Figure 5:
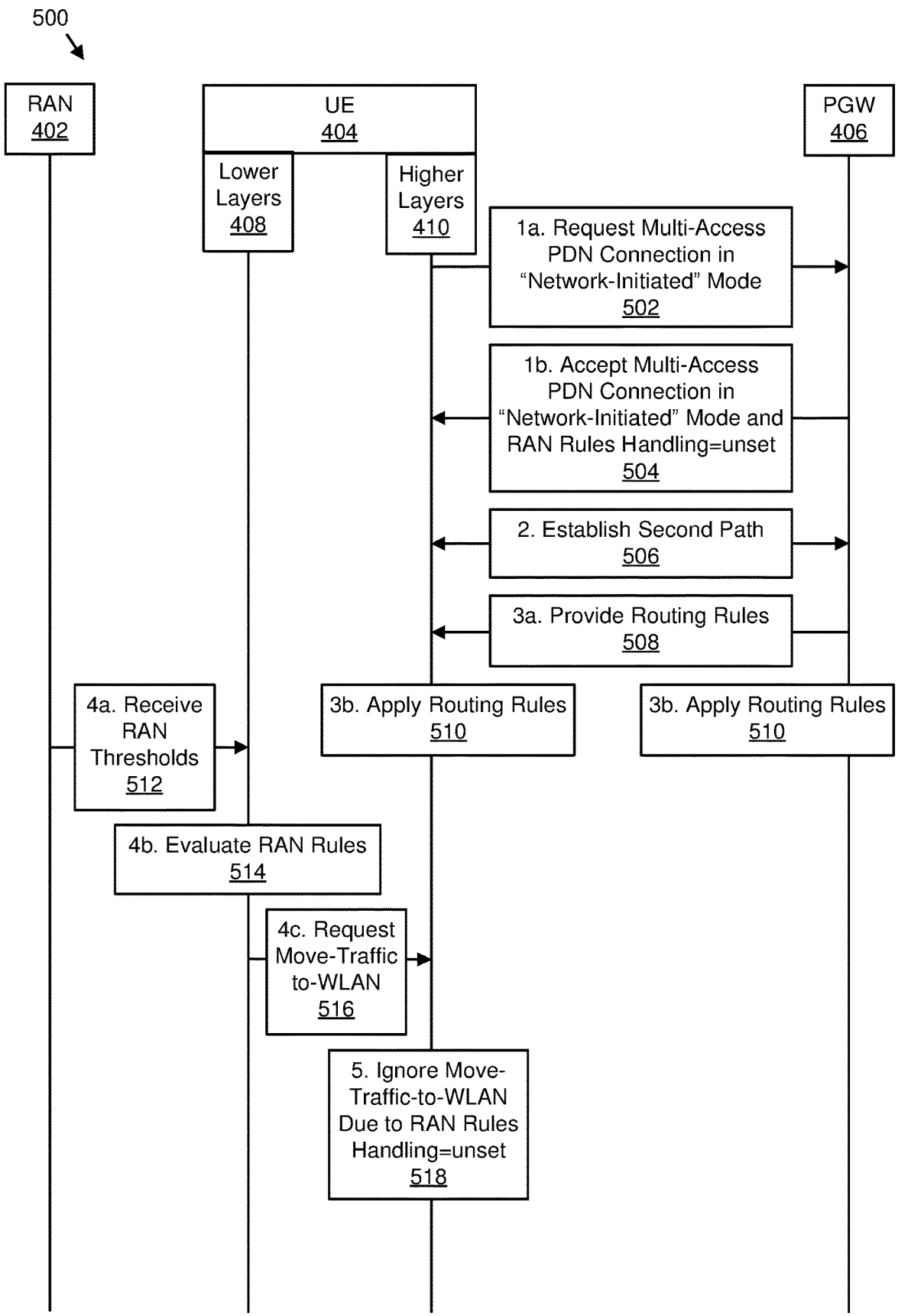
FIG. 5 illustrates another embodiment of communication used for rules handling.

FIG. 5 illustrates another embodiment of communication 500 used for rules handling. In the illustrated embodiment, communication with the RAN 402, the UE 404, and the PGW 406 are illustrated. In certain embodiments, the UE 404 may be one embodiment of the remote unit 102. In some embodiments, the RAN 402 and the PGW 406 may be embodiments of the base unit 104. Moreover, communication with the lower layers 408 and the higher layers 410 of the UE 404 are also illustrated. As may be appreciated, the RAN 402 and the PGW 406 may include features similar to those found in the base unit 104 (e.g., the RAN 402 and/or the PGW 406 may include a processor 302, a memory 304, an input device 306, a display 308, a transmitter 310, and/or a receiver 312).

As illustrated, the higher layers 410 of the UE 404 may request 502 a multi-access PDN connection in a "Network-Initiated" mode via a message sent to the PGW 406. The PGW 406 may accept 504 the multi-access PDN connection in the "Network-Initiated" mode via a message sent to the higher layers 410 of the UE 404. Further, the accept 504 message may include information (e.g., an indication) that indicates whether the UE 404 will apply network traffic steering data (e.g., RAN thresholds). Moreover, the information may be called a "RAN Rules Handling" parameter. The "RAN Rules Handling" parameter in FIG. 5 is equal to unset. With the request 502 and acceptance 504, a first path (e.g., either over cellular access or trusted WLAN access) of a multi-access PDN connection is established.

The higher layers 410 of the UE 404 and the PGW 406 establish 506 a second path of the multi-access PDN connection with one another. Moreover, the PGW 406 provides 508 routing rules to the higher layers 410 of the UE 404. The routing rules are used for routing data among the first and second paths of the multi-access PDN connection. The higher layers 410 of the UE 404 and the PGW 406 apply 510 the routing rules. The lower layers 408 of the UE 404 receives 512 RAN thresholds from the RAN 402. In one embodiment, the RAN thresholds may be from a visited PLMN. Further, the lower layers 408 of the UE 404 evaluate 514 the RAN rules using the RAN thresholds. Based on the evaluation 514, the lower layers 408 of the UE 404 may request 516 that a "move-traffic-to-WLAN" message be sent by the higher layers 410 of the UE 404.

Because the "RAN Rules Handling" parameter is equal to unset (e.g., meaning that RAN rules are not to be applied), the higher layers 410 of the UE 404 ignores 518 the "move-traffic-to-WLAN" message from the lower layers 408 of the UE 404. As may be appreciated, while the "move-traffic-to-WLAN" message is described herein, a "move-traffic-from-WLAN" message may similarly be used for the request 516 and ignoring 518. It should be noted that a "move-traffic-from-WLAN" message is used to indicate that traffic should be moved to a 3GPP (e.g., cellular) access network, while a "move-traffic-to-WLAN" message is used to indicate that traffic should be moved to a WLAN access network.

Figure 6:
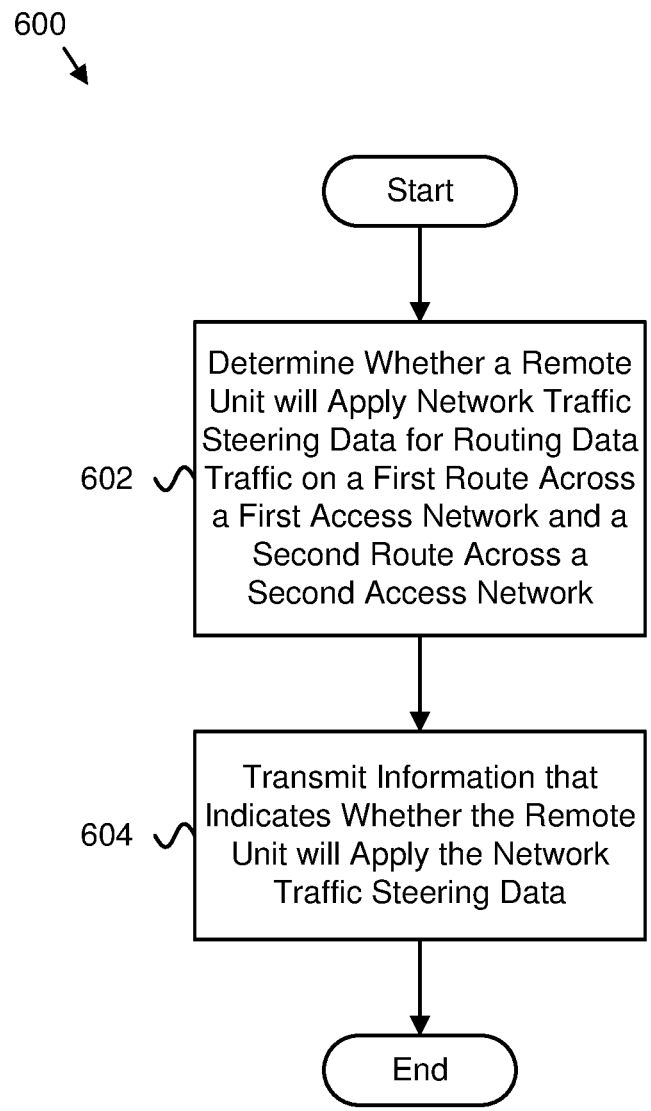
FIG. 6 is a schematic flow chart diagram illustrating one embodiment of a method for rules handling.

FIG. 6 is a schematic flow chart diagram illustrating one embodiment of a method 600 for rules handling. In some embodiments, the method 600 is performed by an apparatus, such as a PGW 108. In certain embodiments, the method 600 may be performed by a processor executing program code, for example, a microcontroller, a microprocessor, a CPU, a GPU, an auxiliary processing unit, a FPGA, or the like.

The method 600 may include determining 602 whether a remote unit 102 (e.g., UE) will apply network traffic steering data (e.g., RAN thresholds) for routing data traffic on a first route across a first access network and a second route across a second access network. In one embodiment, the first route across the first access network includes a 3GPP access network route. In some embodiments, the second route across the second access network includes a WLAN route across a WLAN access network. In certain embodiments, the first and second routes may be different. In some embodiments, determining 602 whether the remote unit will apply network traffic steering data includes applying predetermined rules to determine whether the remote unit will apply network traffic steering data. In various embodiment, determining 602 whether the remote unit will apply network traffic steering data includes determining whether the remote unit will apply network traffic steering data in response to the remote unit requesting a multi-access PDN connection. In certain embodiments, the processor 302 may determine 602 whether the remote unit 102 will apply network traffic steering data.

The method 600 may include transmitting 604 information from the apparatus that indicates whether the remote unit 102 will apply the network traffic steering data, and the method 600 may end. In some embodiments, transmitting 604 the information that indicates whether the remote unit will apply the network traffic steering data includes transmitting a first indication if the remote unit will apply the network traffic steering data and transmitting a second indication if the remote unit will not apply the network traffic steering data. In such embodiments, the first indication may include a set indication (e.g., "RAN Rules Handling=set") and the second indication may include an unset indication (e.g., "RAN Rules Handling=unset"). In certain embodiments, transmitting 604 the information may include transmitting the information from a PGW to a UE. In such embodiments, the information transmitted from the PGW to the UE may indicate whether the UE will apply RAN thresholds. In one embodiment, transmitting 604 the information may include transmitting a RAN rules handling indication. In one embodiment, the transmitter 310 may transmit 604 the information from the apparatus.

Figure 7:
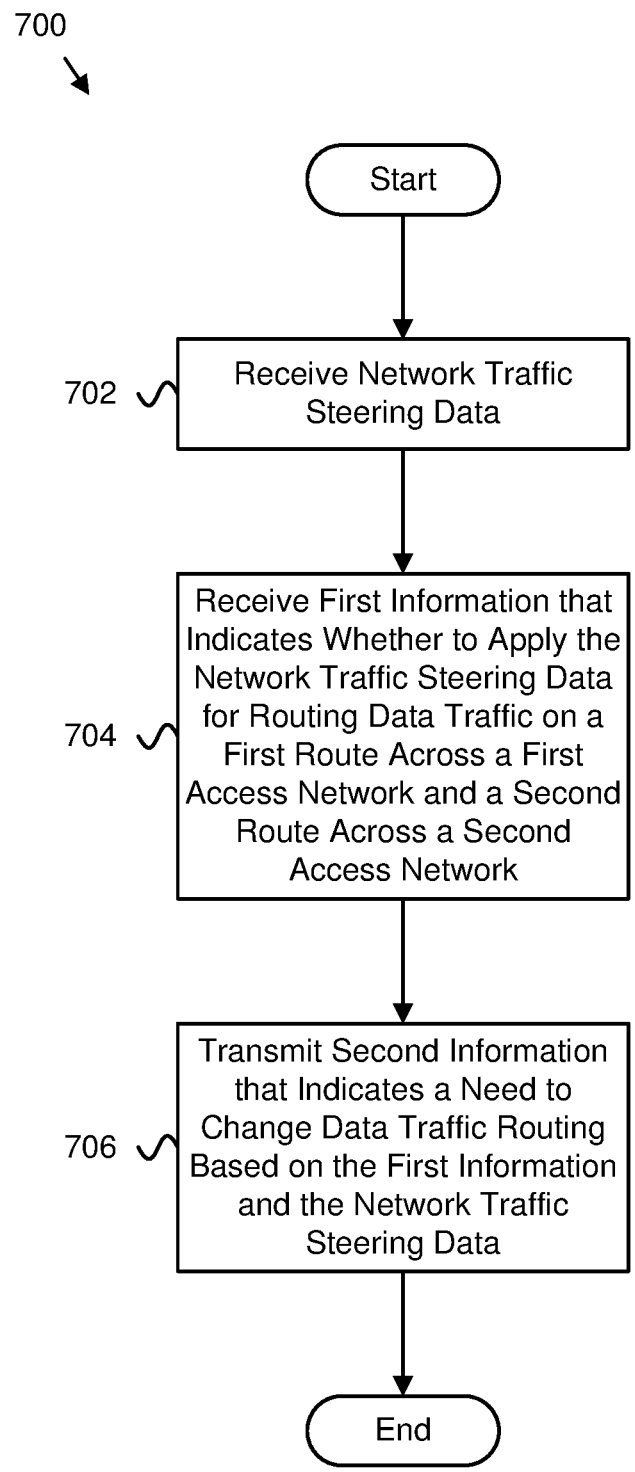
FIG. 7 is a schematic flow chart diagram illustrating another embodiment of a method for rules handling.

FIG. 7 is a schematic flow chart diagram illustrating another embodiment of a method 700 for rules handling. In some embodiments, the method 700 is performed by a remote unit 102, such as a UE. In certain embodiments, the method 700 may be performed by a processor executing program code, for example, a microcontroller, a microprocessor, a CPU, a GPU, an auxiliary processing unit, a FPGA, or the like.

The method 700 may include receiving 702 network traffic steering data (e.g., RAN thresholds). In various embodiments, receiving 702 the network traffic steering data includes receiving the network traffic steering data from a RAN. The method 700 may also include receiving 704 first information that indicates whether to apply the network traffic steering data for routing data traffic on a first route across a first access network and a second route across a second access network (e.g., "RAN Rules Handling=set," "RAN Rules Handling=unset"). In certain embodiments, the first information includes a first indication if the network traffic steering data will be applied and a second indication if the network traffic steering data will not be applied. In such embodiments, the first indication includes a set indication (e.g., "RAN Rules Handling=set") and the second indication includes an unset indication (e.g., "RAN Rules Handling=unset"). In various embodiments, the first information comprises a RAN rules handling indication. In one embodiment, the first and second routes are different. In certain embodiments, the receiver 212 may receive 702 the network traffic steering data and/or receive 704 the first information.

The method 700 may include transmitting 706 second information that indicates a need to change data traffic routing based on the first information and the network traffic steering data. Then the method 700 may end. In certain embodiments, the transmitter 210 may transmit 706 the second information. In various embodiments, transmitting 706 the second information includes transmitting the second information from a UE to a PGW. In some embodiments, the second information is a move-traffic-to-WLAN message or a move-traffic-from-WLAN message.

The method 700 may include determining whether to transmit the second information based on the first information and the network traffic steering data. In one embodiment, the processor 202 may determine whether to transmit the second information based on the first information and the network traffic steering data. In some embodiments, determining whether to transmit the second information includes: determining to transmit the second information if the first information indicates that the network traffic steering data is to be applied and if the network traffic steering data indicates that a change to the data traffic routing is to be made; and determining not to transmit the second information if the first information indicates that the network traffic steering data is to not be applied.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processor of a packet data network gateway that determines whether a remote unit will ignore network traffic steering data for routing data traffic on a first route across a first access network and a second route across a second access network, wherein the first and second routes are different, and the network traffic steering data comprises radio access network thresholds received by the remote unit from a radio access network at a first time; and
a transmitter of the packet data network gateway that transmits a radio access network rules handling parameter that indicates whether the remote unit will ignore the network traffic steering data that the remote unit receives from the radio access network, wherein the radio access network rules handling parameter comprises a first indication that sets the remote unit to not ignore the network traffic steering data or a second indication that sets the remote unit to ignore the network traffic steering data, the radio access network rules handling parameter is transmitted to the remote unit at a second time different from the first time, a first set of protocol layers of the remote unit respond to a traffic steering message from a second set of protocol layers of the remote unit if the radio access network rules handling parameter comprises the first indication, and the first set of protocol layers of the remote unit ignore the traffic steering message from the second set of protocol layers of the remote unit if the radio access network rules handling parameter comprises the second indication.

2. The apparatus of claim 1, wherein the first route comprises a 3rd generation partnership project ("3 GPP") access network route.

3. The apparatus of claim 1, wherein the second route comprises a wireless local area network ("WLAN") route.

4. The apparatus of claim 1, wherein the first indication comprises a set indication and the second indication comprises an unset indication.

5. The apparatus of claim 1, wherein the transmitter transmits the radio access network rules handling parameter to a user equipment ("UE").

6. The apparatus of claim 1, wherein the processor determines whether the remote unit will apply the network traffic steering data by applying predetermined rules for determining whether the remote unit will apply the network traffic steering data.

7. The apparatus of claim 1, wherein the processor determines whether the remote unit will apply the network traffic steering data in response to the remote unit requesting a multi-access packet data network ("PDN") connection.

8. The apparatus of claim 5, wherein the radio access network rules handling parameter indicates whether the UE will apply radio access network thresholds.

9. A method comprising:
determining, by a packet data network gateway, whether a remote unit will ignore network traffic steering data for routing data traffic on a first route across a first access network and a second route across a second access network, wherein the first and second routes are different, and the network traffic steering data comprises radio access network thresholds received by the remote unit from a radio access network at a first time; and
transmitting, by the packet data network gateway, a radio access network rules handling parameter that indicates whether the remote unit will ignore the network traffic steering data that the remote unit receives from the radio access network, wherein the radio access network rules handling parameter comprises a first indication that sets the remote unit to not ignore the network traffic steering data or a second indication that sets the remote unit to ignore the network traffic steering data, the radio access network rules handling parameter is transmitted to the remote unit at a second time different from the first time, a first set of protocol layers of the remote unit respond to a traffic steering message from a second set of protocol layers of the remote unit if the radio access network rules handling parameter comprises the first indication, and the first set of protocol layers of the remote unit ignore the traffic steering message from the second set of protocol layers of the remote unit if the radio access network rules handling parameter comprises the second indication.

10. The method of claim 9, wherein the first route comprises a 3rd generation partnership project ("3 GPP") access network route.

11. The method of claim 9, wherein the second route comprises a wireless local area network ("WLAN") route.

12. The method of claim 9, wherein the first indication comprises a set indication and the second indication comprises an unset indication.

13. The method of claim 9, wherein transmitting the radio access network rules handling parameter comprises transmitting the radio access network rules handling parameter from the packet data network gateway ("PGW") to a user equipment ("UE").

14. The method of claim 9, wherein determining whether the remote unit will apply network traffic steering data comprises applying predetermined rules to determine whether the remote unit will apply network traffic steering data.

15. The method of claim 9, wherein determining whether the remote unit will apply network traffic steering data comprises determining whether the remote unit will apply network traffic steering data in response to the remote unit requesting a multi-access packet data network ("PDN") connection.

16. The method of claim 13, wherein the radio access network rules handling parameter transmitted from the PGW to the UE indicates whether the UE will apply radio access network thresholds.

17. An apparatus comprising:
a receiver that receives network traffic steering data comprising radio access network thresholds from a radio access network at a first time and a radio access network rules handling parameter from a packet data network gateway at a second time different from the first time, wherein the radio access network rules handling parameter indicates whether to ignore the network traffic steering data for routing data traffic on a first route across a first access network and a second route across a second access network, the first and second routes are different, the radio access network rules handling parameter comprises a first indication that sets the network traffic steering data to be not ignored and transmits a second indication that sets the network traffic steering data to be ignored, a first set of protocol layers of the apparatus respond to a traffic steering message from a second set of protocol layers of the apparatus if the radio access network rules handling parameter comprises the first indication, and the first set of protocol layers of the apparatus ignore the traffic steering message from the second set of protocol layers of the apparatus if the radio access network rules handling parameter comprises the second indication; and
a transmitter that transmits second information that indicates a need to change data traffic routing based on the radio access network rules handling parameter and the network traffic steering data.

18. The apparatus of claim 17, wherein the apparatus comprises a user equipment ("UE").

19. The apparatus of claim 17, wherein the transmitter transmits the second information from a UE to the packet data network gateway.

20. The apparatus of claim 17, wherein the second information is a move-traffic-to-wireless local area network ("WLAN") message or a move-traffic-from-WLAN message.

21. The apparatus of claim 17, wherein the first indication comprises a set indication and the second indication comprises an unset indication.

22. The apparatus of claim 17, comprising a processor that determines whether to transmit the second information based on the radio access network rules handling parameter and the network traffic steering data.

23. The apparatus of claim 22, wherein the processor determines whether to transmit the second information by:
determining to transmit the second information:
if the radio access network rules handling parameter indicates that the network traffic steering data is to be applied; and
if the network traffic steering data indicates that a change to the data traffic routing is to be made; and
determining not to transmit the second information if the radio access network rules handling parameter indicates that the network traffic steering data is to not be applied.

24. A method comprising:
receiving network traffic steering data comprising radio access network thresholds from a radio access network at a first time;
receiving a radio access network rules handling parameter from a packet data network gateway at a second time different from the first time, wherein the radio access network rules handling parameter indicates whether to ignore the network traffic steering data for routing data traffic on a first route across a first access network and a second route across a second access network, the first and second routes are different, and the radio access network rules handling parameter comprises a first indication that sets the network traffic steering data to be not ignored and transmits a second indication that sets the network traffic steering data to be ignored, a first set of protocol layers of the apparatus respond to a traffic steering message from a second set of protocol layers of the apparatus if the radio access network rules handling parameter comprises the first indication, and the first set of protocol layers of the apparatus ignore the traffic steering message from the second set of protocol layers of the apparatus if the radio access network rules handling parameter comprises the second indication; and
transmitting second information that indicates a need to change data traffic routing based on the radio access network rules handling parameter and the network traffic steering data.

25. The method of claim 24, wherein a user equipment ("UE") receives the network traffic steering data and the radio access network rules handling parameter, and transmits the second information.

26. The method of claim 24, wherein transmitting the second information comprises transmitting the second information from a UE to the packet data network gateway.

27. The method of claim 24, wherein the second information is a move-traffic-to-wireless local area network ("WLAN") message or a move-traffic-from-WLAN message.

28. The method of claim 24, wherein the first indication comprises a set indication and the second indication comprises an unset indication.

29. The method of claim 24, comprising determining whether to transmit the second information based on the radio access network rules handling parameter and the network traffic steering data.

30. The method of claim 24, wherein determining whether to transmit the second information comprises:
   determining to transmit the second information:
   if the radio access network rules handling parameter indicates that the network traffic steering data is to be applied; and
   if the network traffic steering data indicates that a change to the data traffic routing is to be made; and
   determining not to transmit the second information if the radio access network rules handling parameter indicates that the network traffic steering data is to not be applied.

\* \* \* \* \*